(12) United States Patent  
Behne et al.

(10) Patent No.: US 6,736,042 B2
(45) Date of Patent: May 18, 2004

(54) WORK PIECE GUIDING SYSTEM FOR A TABLE SAW

(75) Inventors: Rockne Wade Behne, Jackson, TN (US); Todd Chipner, Jackson, TN (US); Jaime Garcia, Jackson, TN (US); John Charles Smith, Jackson, TN (US); Brent Edward Stafford, McLemoresville, TN (US); Zhilong Zhang, Collierville, TN (US)

(73) Assignee: Porter-Cable Corporation, Jackson, TN (US)

( * ) Notice: Subject to any disclaimer, the term of this patent is extended or adjusted under 35 U.S.C. 154(b) by 10 days.

(21) Appl. No.: 10/096,366

(22) Filed: Mar. 11, 2002

(65) Prior Publication Data

US 2002/0174755 A1 Nov. 28, 2002

Related U.S. Application Data

(63) Continuation-in-part of application No. 29/137,901, filed on Mar. 1, 2001, now Pat. No. Des. 461,833.

(51) Int. Cl.[7] ................................................ B27H 1/00
(52) U.S. Cl. ..................................... 83/440.2; 83/477.2
(58) Field of Search .............................. 83/440.2, 477.2

(56) References Cited

U.S. PATENT DOCUMENTS

| | | | |
|---|---|---|---|
| 264,412 A | * | 9/1882 | Kuhlmann ................. 83/440.2 |
| 412,452 A | | 10/1889 | Beugler |
| 580,658 A | | 4/1897 | Burnham |
| 641,027 A | | 1/1900 | Martin |
| 843,591 A | | 2/1907 | Edwards |
| 1,089,223 A | * | 3/1914 | Jenkins ...................... 83/440.2 |
| 1,465,224 A | * | 8/1923 | Lantz ..................... 83/440.2 X |
| 1,864,840 A | | 6/1932 | Lehner |
| 1,938,548 A | | 12/1933 | Tautz |
| 2,166,703 A | | 7/1939 | Boice |
| 2,325,082 A | | 7/1943 | Tautz |
| 2,548,279 A | | 4/1951 | Young |
| 2,576,340 A | | 11/1951 | Hammond |
| 2,641,845 A | | 6/1953 | Gundlach |
| 2,744,549 A | | 5/1956 | Johnson |
| 2,806,493 A | | 9/1957 | Gaskell |
| 2,808,084 A | | 10/1957 | Eschenburg et al. |
| 2,852,049 A | | 9/1958 | Peterson |
| 3,242,780 A | | 3/1966 | Ried et al. |
| 3,348,591 A | | 10/1967 | Carrasco |
| 4,111,409 A | | 9/1978 | Smith |

(List continued on next page.)

Primary Examiner—Charles Goodman
(74) Attorney, Agent, or Firm—Suiter West PC LLO

(57) ABSTRACT

An improved table having improvements related to stock support, such as a rip fence stock support, as well as a lateral-table support system; features of laterally-slideable front and back rip fence guide rails, including an improved front rail configuration, an improved rear rail configuration, and an especially-configured front and back rail combination, including a rail configuration having cross-sectional aspects configured for use as both the front and rear rail, each instance of improved rail configuration providing the basis for an improved rip-fence locking system; improved sliding-rail lock shoes, including lock shoes that comprise an improved cross section for sliding in T-track, as well as lock and support shoes having a particular raised rib, also for improved sliding in a laterally-adjustable rail system, and a system wherein of one two rail shoes per rail, a rail-locking support shoe, is configured for biasing, and wherein the other shoe for each rail, a rail supporting shoe, remains fixed; front and back laterally-sliding fence rails coupled together in combination with an improved locking system; and a blade guard with quick-coupling and quick-release configuration for quickly and easily coupling and releasing the guard to and from the blade arbor.

16 Claims, 20 Drawing Sheets

U.S. PATENT DOCUMENTS

| | | | |
|---|---|---|---|
| 4,128,029 A | 12/1978 | Gay et al. |
| 4,206,910 A | 6/1980 | Biesemeyer |
| 4,367,668 A | 1/1983 | Jensen |
| 4,397,598 A | 8/1983 | Ess et al. |
| 4,406,200 A | 9/1983 | Kerr |
| 4,445,412 A | 5/1984 | Peters |
| 4,454,793 A | 6/1984 | Strong |
| 4,481,846 A | 11/1984 | Goodell |
| 4,521,006 A | 6/1985 | Waters |
| 4,558,618 A | 12/1985 | Bachmann et al. |
| 4,566,510 A | 1/1986 | Bartlett et al. |
| 4,600,184 A | 7/1986 | Ashworth |
| 4,658,687 A | 4/1987 | Haas et al. |
| 4,677,920 A | 7/1987 | Eccardt |
| 4,696,213 A | 9/1987 | Conneally |
| 4,726,405 A | 2/1988 | Bassett |
| 4,846,036 A | 7/1989 | Metzger, Jr. et al. |
| 4,848,203 A | 7/1989 | Brooks |
| 4,887,653 A | 12/1989 | Thomas |
| 4,962,685 A * | 10/1990 | Hagstrom ............... 83/440.2 X |
| 4,964,450 A | 10/1990 | Hughes et al. |
| 5,018,562 A | 5/1991 | Adams |
| 5,040,444 A | 8/1991 | Shiotani et al. |
| 5,078,373 A | 1/1992 | Miller |
| 5,098,000 A | 3/1992 | Rumpf et al. |
| 5,116,249 A | 5/1992 | Shiotani et al. |
| 5,123,317 A | 6/1992 | Barnes, Jr. et al. |
| 5,174,349 A | 12/1992 | Svetlik et al. |
| 5,181,446 A | 1/1993 | Theising |
| 5,201,863 A | 4/1993 | Peot |
| 5,230,269 A | 7/1993 | Shiotani et al. |
| 5,293,802 A | 3/1994 | Shiotani et al. |
| 5,337,641 A | 8/1994 | Duginske |
| D354,757 S | 1/1995 | Wixey |
| 5,460,070 A | 10/1995 | Buskness |
| 5,544,559 A | 8/1996 | Thiele et al. |
| 5,577,429 A | 11/1996 | Noble |
| 5,619,896 A | 4/1997 | Chen |
| 5,722,308 A | 3/1998 | Ceroll et al. |
| D394,071 S | 5/1998 | Ceroll et al. |
| D395,322 S | 6/1998 | Ceroll et al. |
| 5,758,558 A | 6/1998 | Squires |
| D397,344 S | 8/1998 | Ceroll et al. |
| D400,217 S | 10/1998 | Ceroll et al. |
| 5,857,507 A | 1/1999 | Puzio et al. |
| D407,725 S | 4/1999 | Ceroll et al. |
| D410,474 S | 6/1999 | Ceroll et al. |
| D411,090 S | 6/1999 | Chang |
| 5,927,857 A | 7/1999 | Ceroll et al. |
| D414,786 S | 10/1999 | Ceroll et al. |
| 5,979,523 A | 11/1999 | Puzio et al. |
| D425,529 S | 5/2000 | Svetlik |
| D425,918 S | 5/2000 | Ceroll et al. |
| 6,062,121 A | 5/2000 | Ceroll et al. |
| 6,148,703 A | 11/2000 | Ceroll et al. |
| 6,161,459 A | 12/2000 | Ceroll et al. |
| 6,170,370 B1 | 1/2001 | Sommerville |
| 6,250,190 B1 | 6/2001 | Ceroll et al. |
| D444,485 S | 7/2001 | Ceroll et al. |
| D445,119 S | 7/2001 | Ceroll et al. |
| 6,357,328 B1 | 3/2002 | Ceroll et al. |
| D458,281 S | 6/2002 | Ceroll et al. |
| 6,405,624 B2 * | 6/2002 | Sutton ................... 83/477.2 X |
| 6,418,829 B1 * | 7/2002 | Pilchowski ................ 83/477.2 |

* cited by examiner

WORK PIECE GUIDING SYSTEM FOR A TABLE SAW

This is a continuation in part of application Ser. No. 29/137,901 filed Mar. 1, 2001 is now Des. Pat. No. 461,833.

BACKGROUND AND SUMMARY OF THE INVENTION

A typical table saw includes a work table and a saw blade extending through a slot in the top surface of the table. A work piece is typically placed flat upon the work table to support and orient the work piece as it is moved across the table and cut by the saw blade. A miter guide and rip fence are also typically available to guide the work piece on a desired path across the work table. The miter guide is typically used for crosscutting, and the rip fence is typically used for ripping.

An improved table saw is described in this application. This patent application describes table saw improvements related to stock support, such as a rip fence stock support, as well as a lateral-table support system; features of laterally-slideable front and back rip fence guide rails, including an improved front rail configuration, an improved rear rail configuration, and an especially-configured front and back rail combination, including a rail configuration having cross-sectional aspects configured for use as both the front and rear rail, each instance of improved rail configuration providing the basis for an improved rip-fence locking system; improved sliding-rail lock shoes, including lock shoes that comprise an improved cross section for sliding in T-track, as well as lock and support shoes having a particular raised rib, also for improved sliding in a laterally-adjustable rail system, and a system wherein of one two rail shoes per rail, a rail-locking support shoe, is configured for biasing, and wherein the other shoe for each rail, a rail supporting shoe, remains fixed; front and back laterally-sliding fence rails coupled together in combination with an improved locking system; and a blade guard with quick-coupling and quick-release configuration for quickly and easily coupling and releasing the guard to and from the blade arbor.

DETAILED DESCRIPTION OF THE PREFERRED EMBODIMENTS

Figure 1:
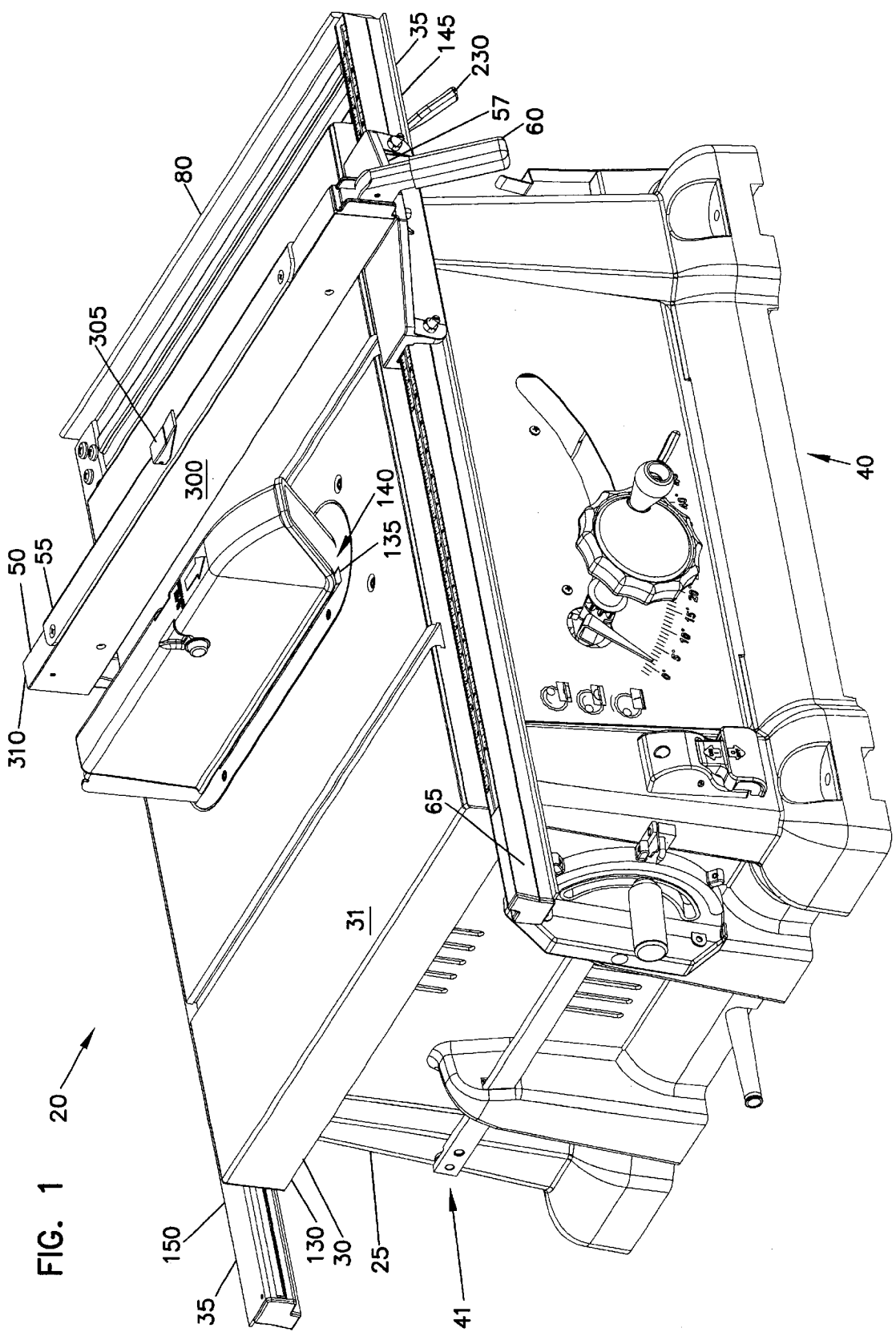
FIG. 1 is a front top left perspective view of a table saw having a workpiece support system in a storage configuration.

A machine tool 20 such as a table saw includes a base 25 that supports a work table 30 having a work piece support surface 31. One or more adjustable rails 35 may be slidably coupled to a front side of the work table 30 by one or more T-Nuts or shoes 45. Copending application Ser. No. 29/137,901 is incorporated herein by reference.

In one embodiment, a rail locking system 47 may be provided for locking the rails in a position. A laterally adjustable fence 50 may be slidably coupled to the adjustable rails 35 by a sled 57 and a clamp 60. The rails 35 may include an oblique surface 65 for interfacing with the clamp 60, so that engaging the clamp 60 pulls the fence 50 downward in alignment with the work table 30 and with a cutting tool 70.

As shown in FIG. 1, the adjustable rails 35 may be positioned in an inner configuration. This configuration may be advantageous when a small workpiece is being cut, or when the table saw is being stored or transported.

Figure 2:
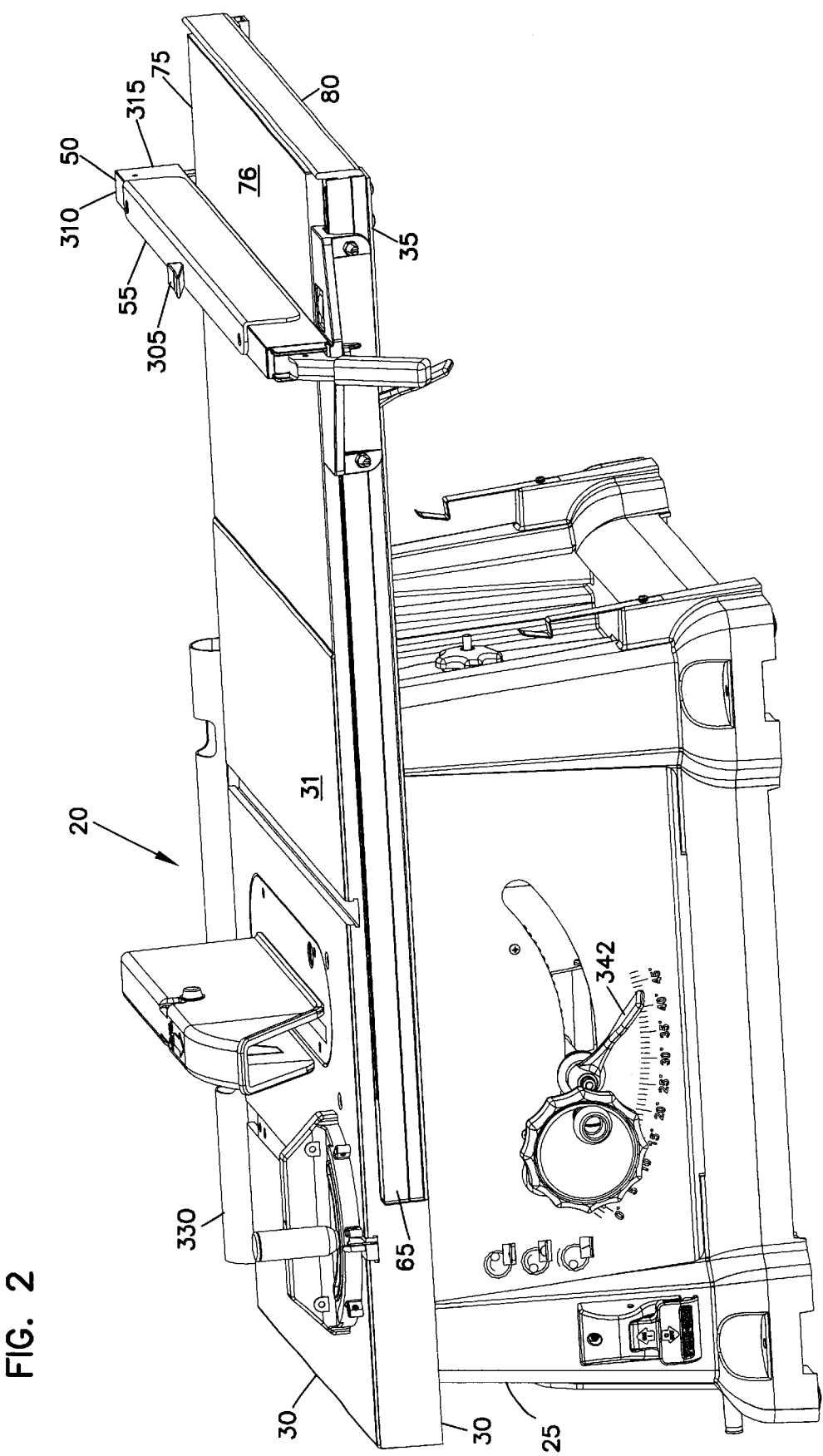
FIG. 2 is a front top right perspective view of a table saw having a supplemental work piece support member installed between two adjustable rails.
Figure 3:
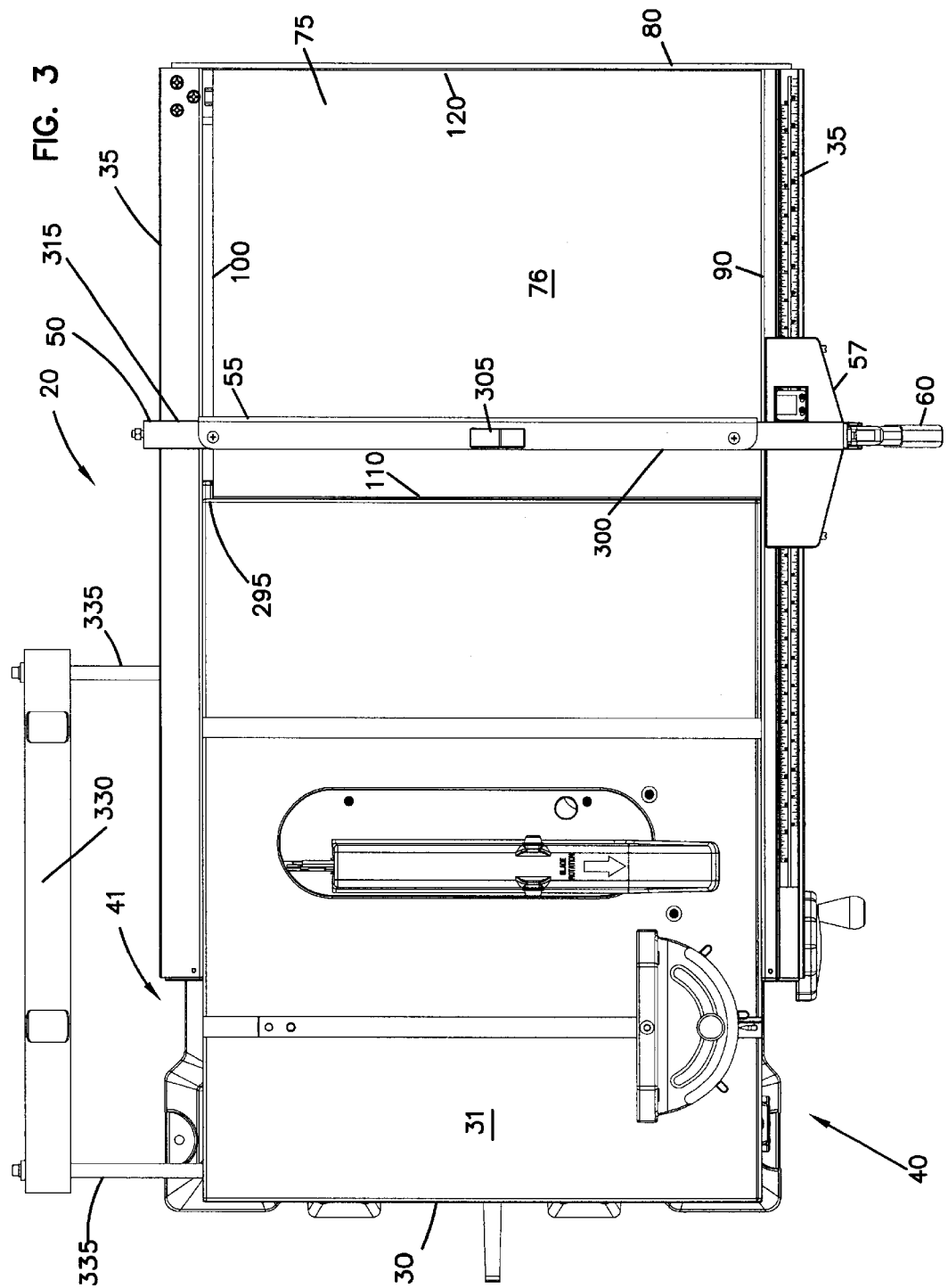
FIG. 3 is a top plan view thereof.

The rails may also be extended to an outer position, shown in FIGS. 2–5. As shown in FIGS. 2 and 3, when the rails are in the outer position, a supplemental support member 75 may be inserted between the rails to provide a supplemental work surface 76 beyond the work table support surface 31. Inserting a supplemental support member 75 to provide a supplemental work surface allows for cutting a work piece that extends beyond the work table support surface 31.

Figure 4:
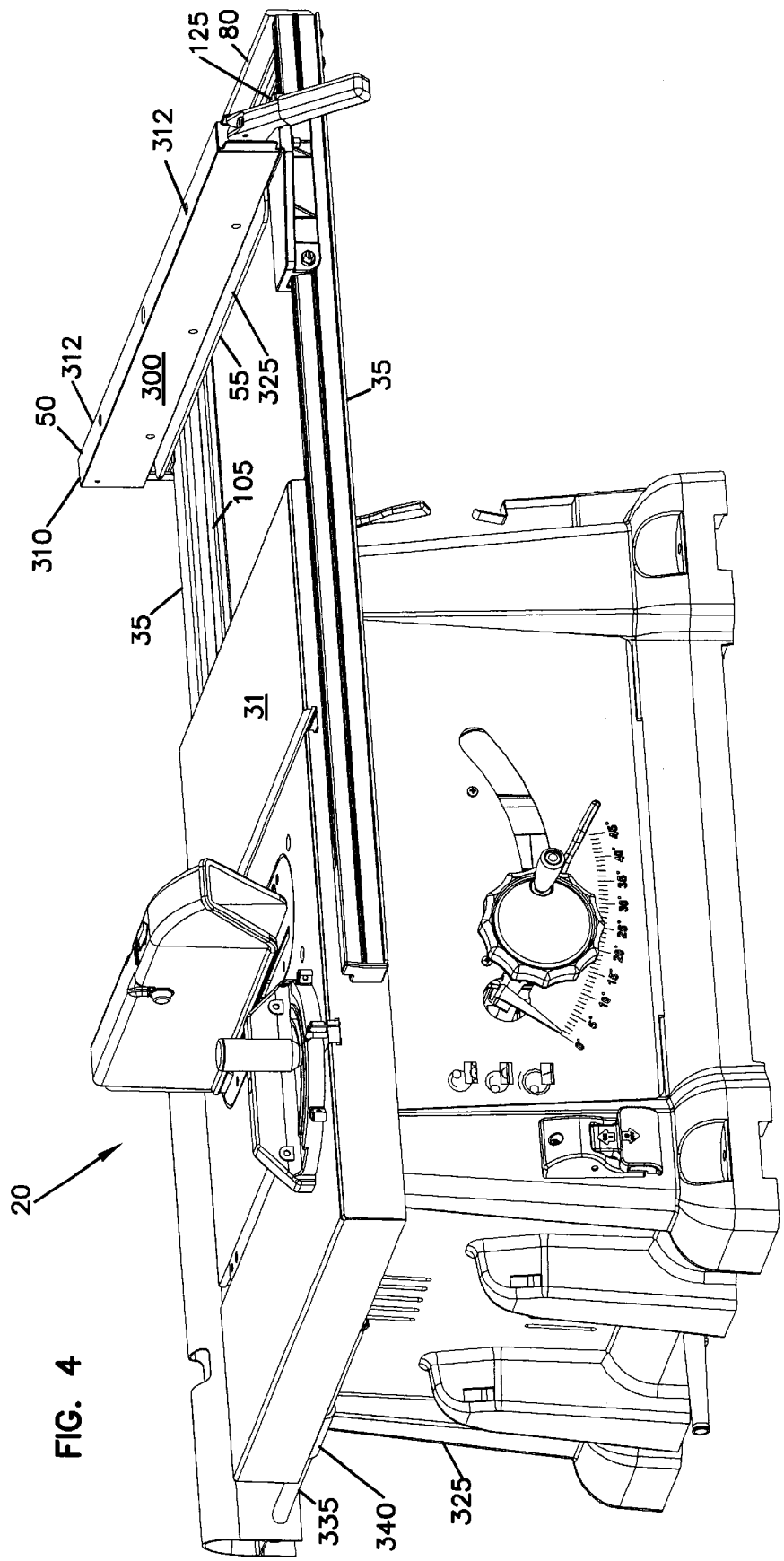
FIG. 4 is a front top left perspective view of a table saw having an adjustable rail system in an extended configuration and a workpiece support system in an in-use configuration.
Figure 5:
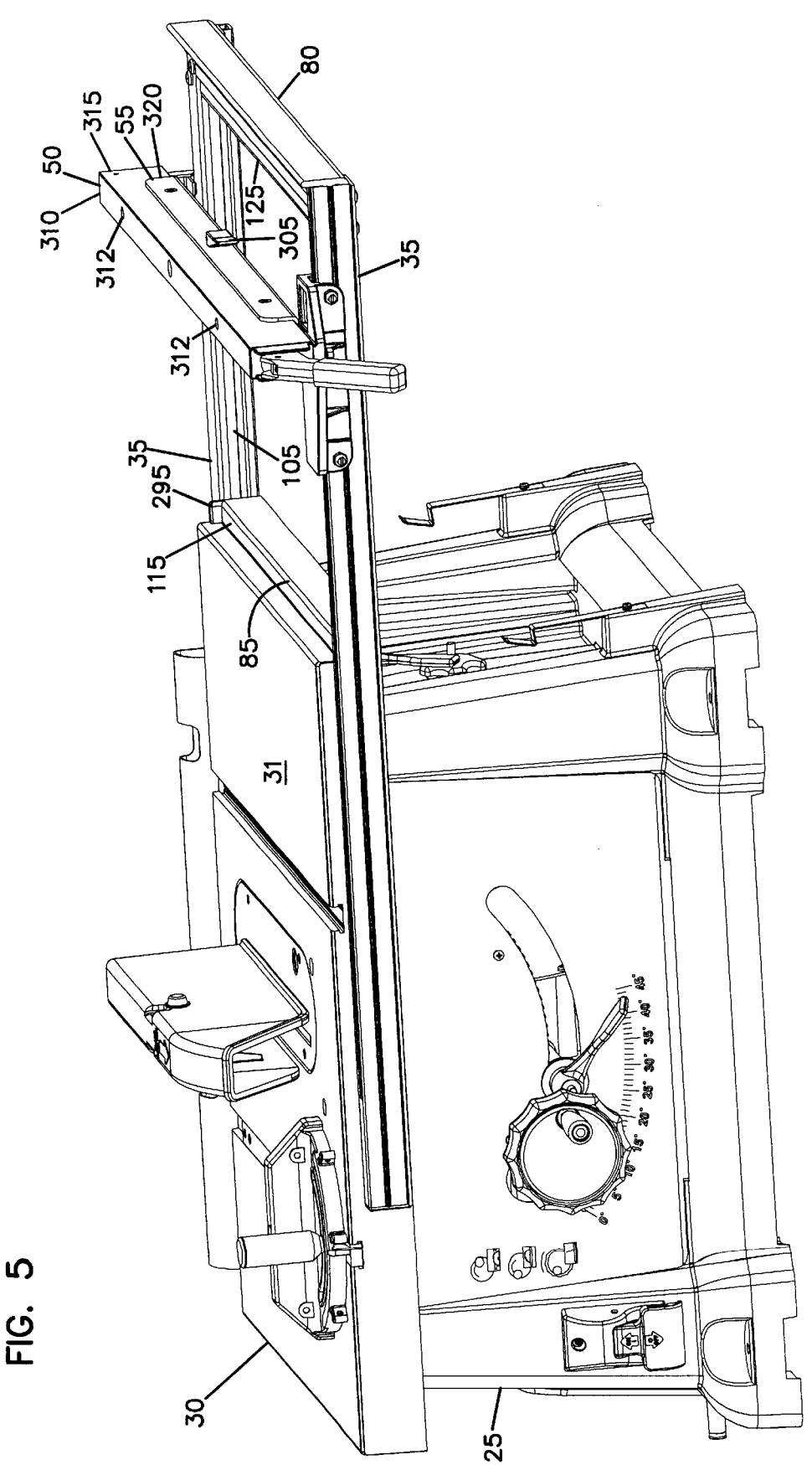
FIG. 5 is a front top right view thereof.
Figure 6:
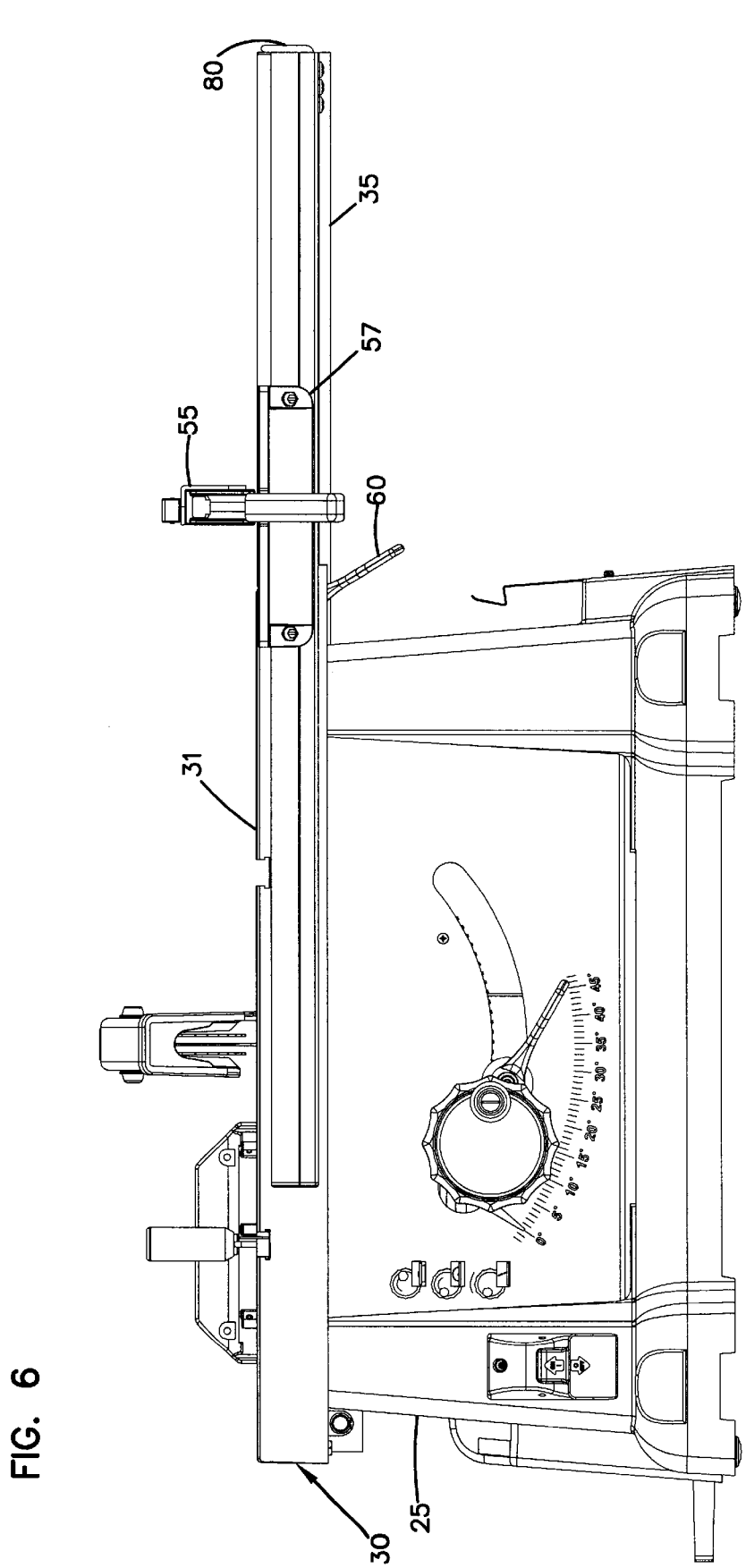
FIG. 6 is a front elevational view thereof
Figure 7:
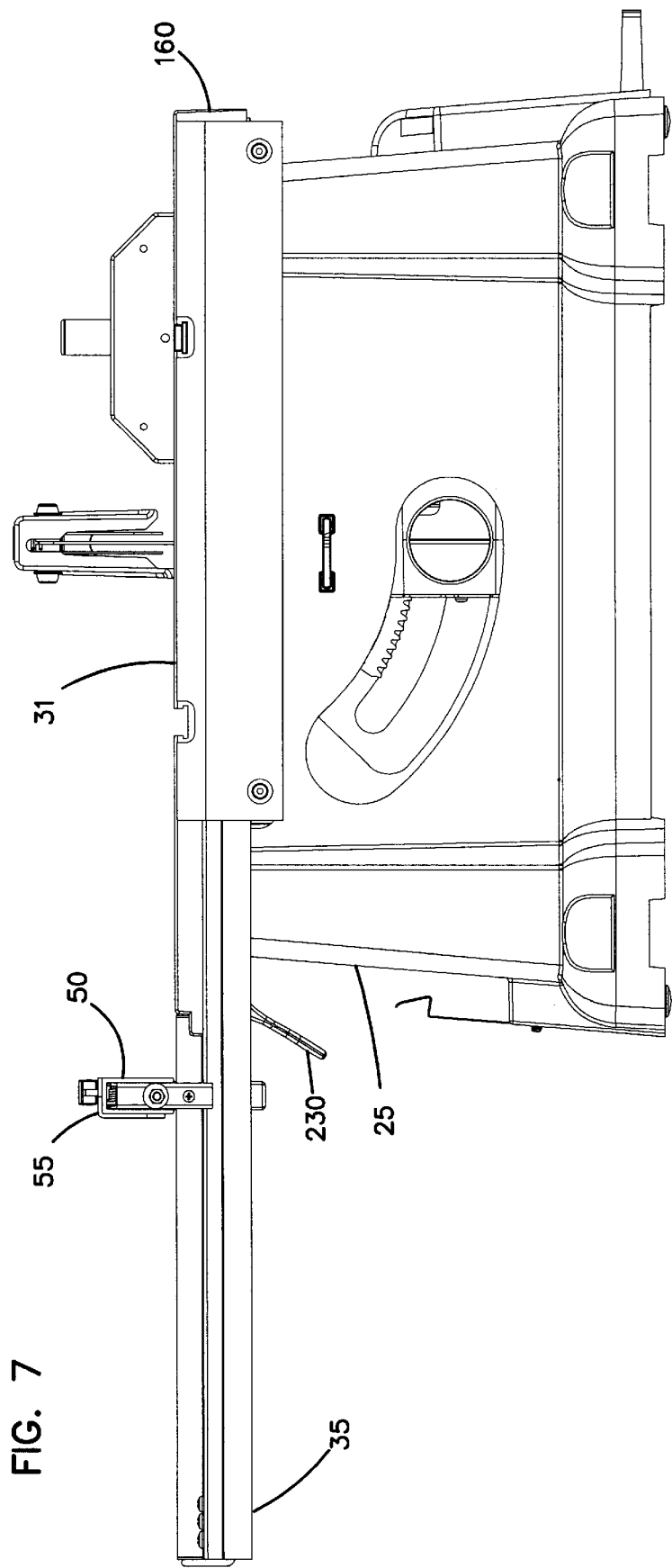
FIG. 7 is a rear elevational view thereof.

In another embodiment, a removable fence ledge 55 may be coupled to the fence for supporting a workpiece that extends beyond the work table support surface 31, as shown in FIGS. 4 and 5. The fence ledge 55 may be removably coupled to the fence 50 ledge with a portion of the ledge extending beneath the fence to provide a support surface 56 for supporting a workpiece. When the fence ledge 55 is not in use, it may be stored on top of the fence 50, as shown in FIGS. 1–3.

Referring again to FIG. 1, the work table 30 has an upper support surface 31 and side members 130 extending downwardly from the support surface. The support surface 31 has portions defining a slot 135. A cutting tool such as a rotary table saw blade 140 extends through the slot 135. The saw blade 140 may be coupled to an electric motor which may be activated to turn the saw blade.

As shown in FIGS. 1–5, rails 35 extend laterally across the machine tool 20 and are positionable in a variety of configurations relative to the machine tool. In a preferred adjustable rail system, a front rail 145 may be coupled to the front side 40 of the machine tool 20 and a rear rail 150 may be coupled to the rear side 41 of the table saw. Both rails preferably extend in a direction that is substantially perpendicular to the saw blade 140 and substantially parallel to the work table support surface 31.

Figure 10:
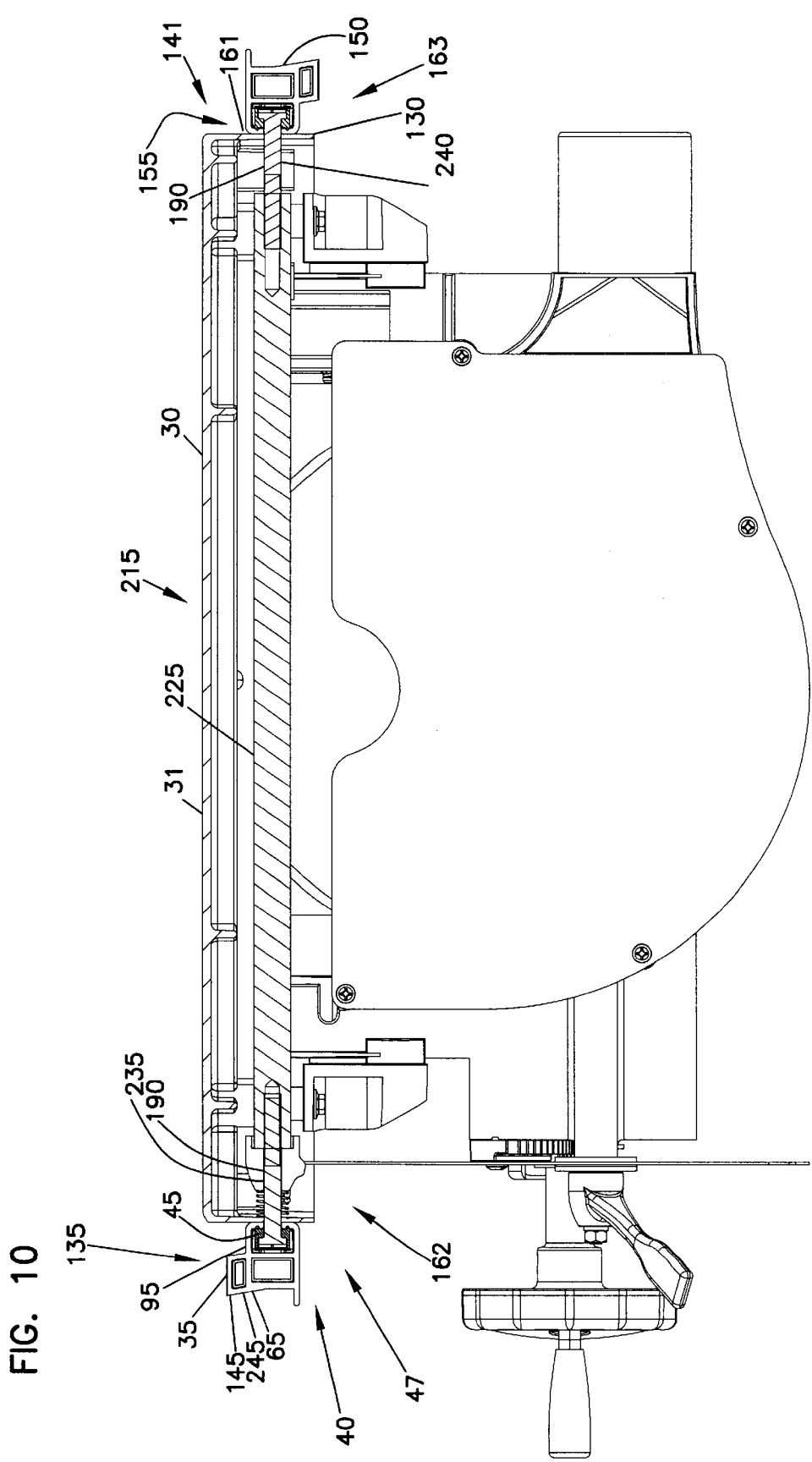
FIG. 10 is a cross-sectional view showing a rail coupling system and a rail locking system.
Figure 11:
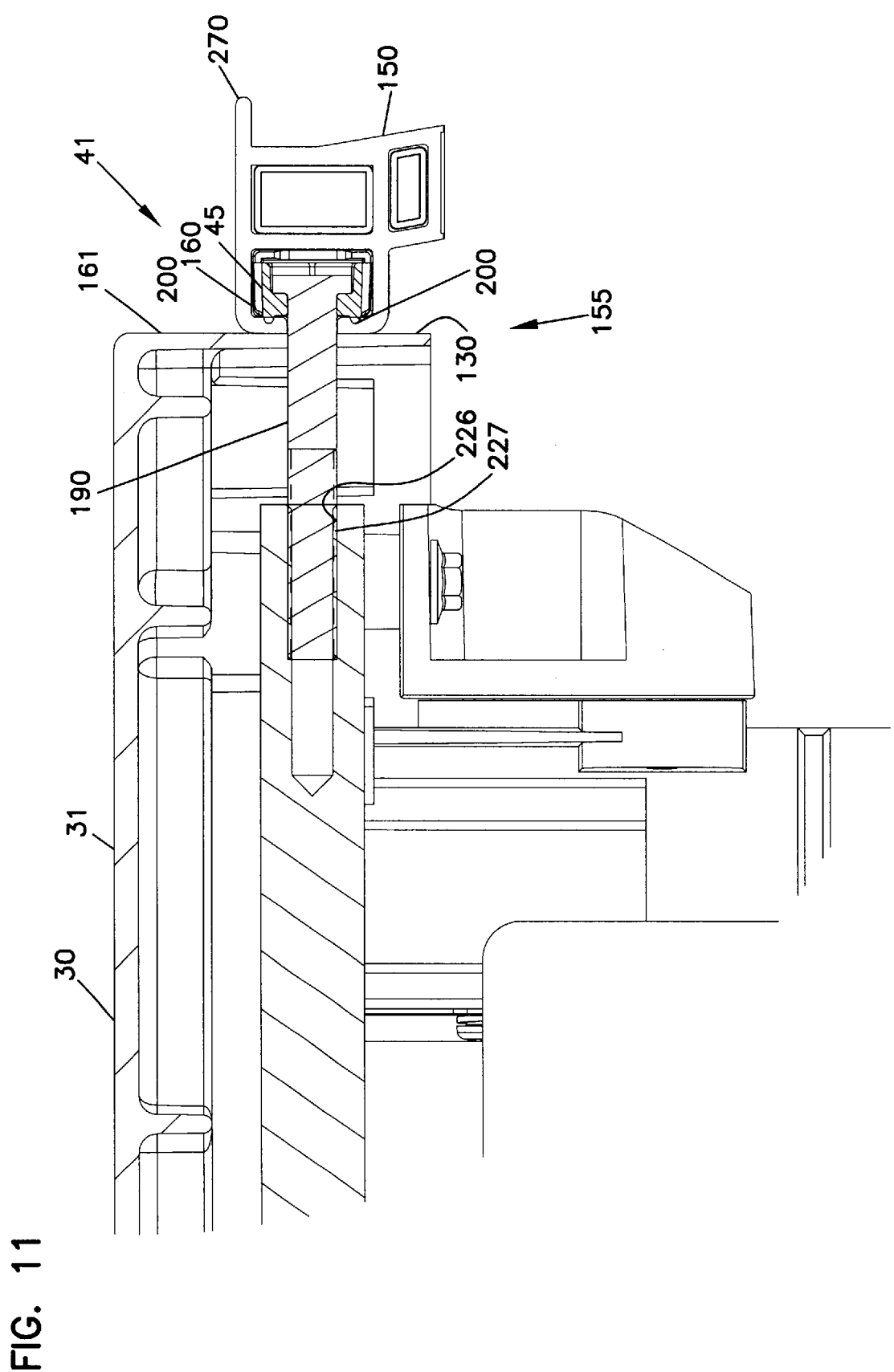
FIG. 11 is an enlarged view thereof showing the rear rail with coupling system.

In one embodiment, the rails 35 may be coupled to the table saw base with a coupling system 155 that includes one or more shoes 45 or T-nut fasteners. A shoe 45 may include an elongated body member having a wider portion 170 and a narrower portion 175, as shown in FIGS. 13–16. Each rail has a T-shaped inner cross-section that generally matches the outer cross-sectional shape of a rail locking shoe 160, as shown in FIGS. 10 and 11. The wider portion 170 of the shoe slides in a wider slot 180 of the rail cross-section, and the narrower portion 175 of the shoe slides in a narrower slot 185 of the rail cross-section. The shoe 45 may be configured to receive a coupling member 190 such as a bolt for coupling the shoe to the table saw. For example, the shoe may include portions defining a hexagonal cavity 195 for receiving and engaging a bolt 190 to prevent rotation of the bolt relative to the shoe.

Figure 14:
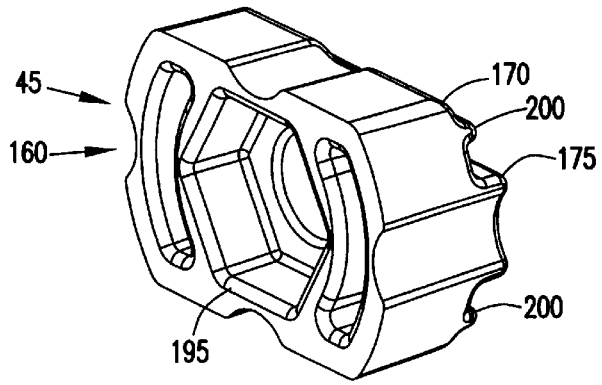
FIG. 14 is a back top left rear thereof.
Figure 15:
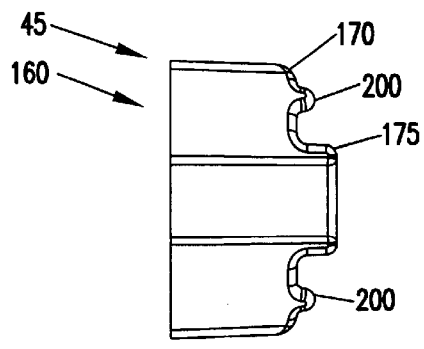
FIG. 15 is a left side view thereof.
Figure 16:
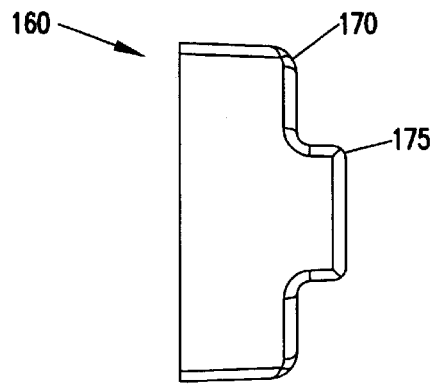
FIG. 16 is a left side view of a rail-supporting shoe.
Figure 17:
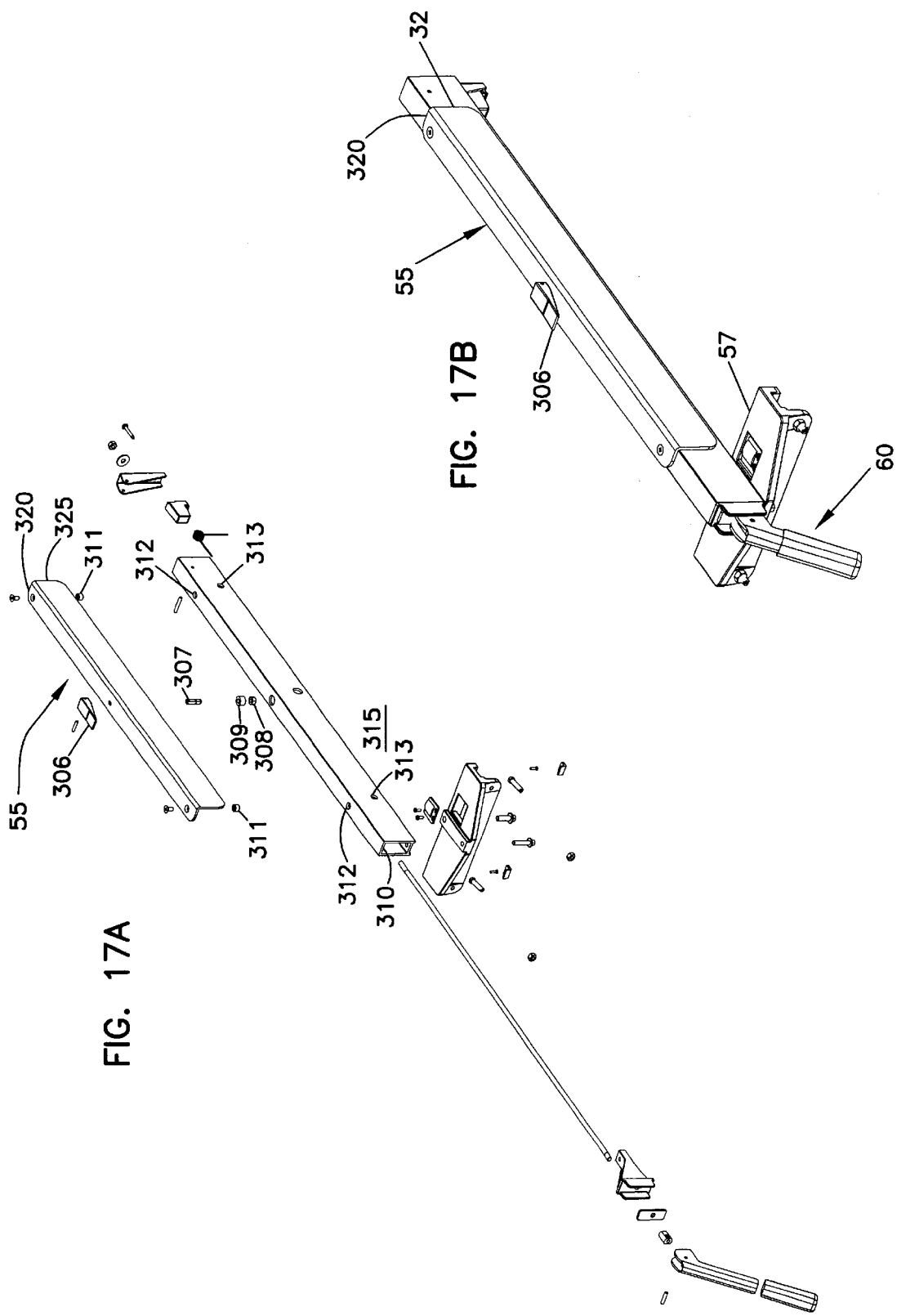
FIG. 17 is an exploded assembly view of a fence assembly with a fenceledge.
Figure 18:
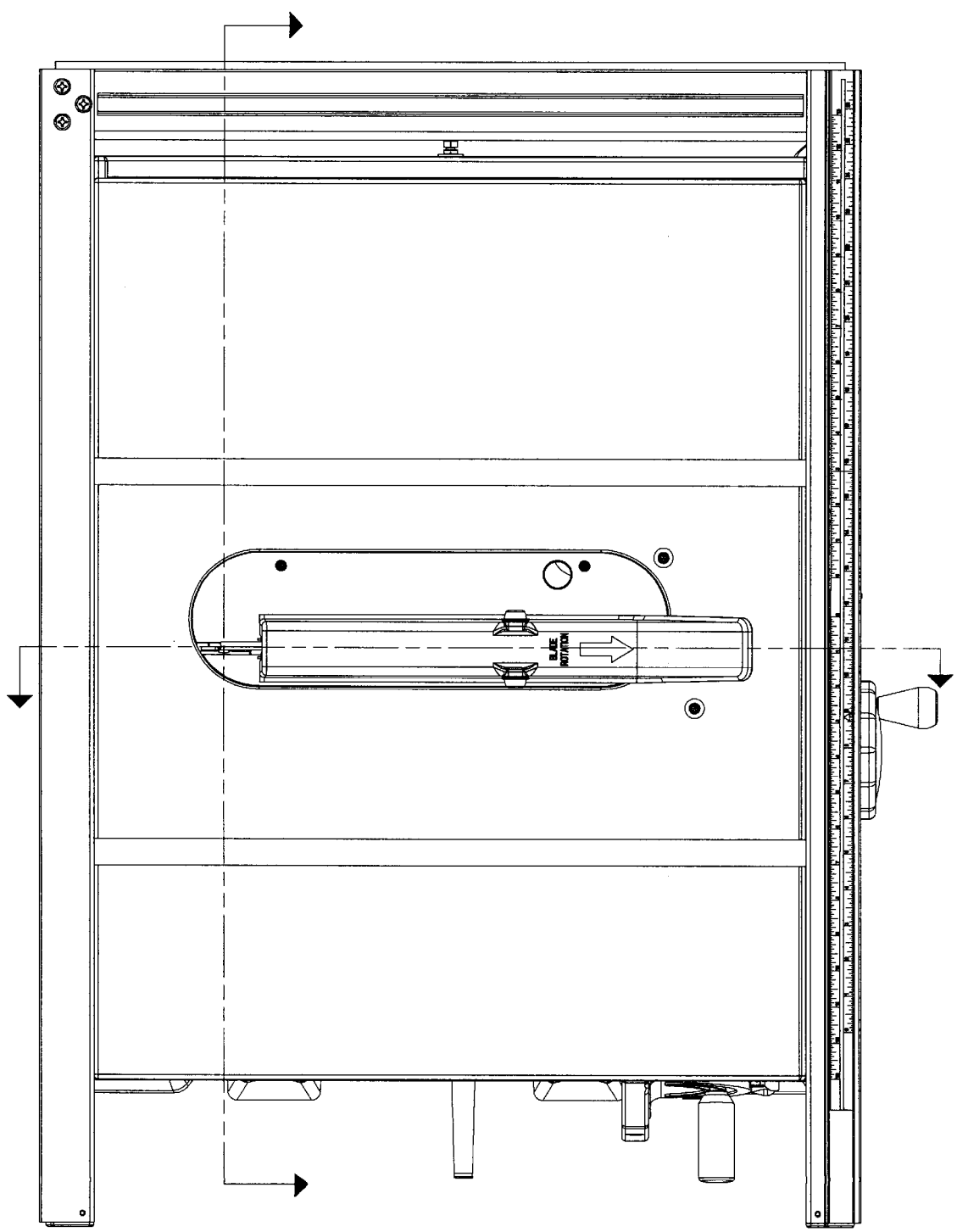
FIG. 18 is a top plan view of a table saw, with lines indicating the location of sections in views 19 and 20.

In one embodiment, the coupling system 155 may include a rail-locking shoe 160 and a rail-supporting shoe 165. The rail locking shoe 160 preferably includes one or more raised ribs 200 for engaging and gripping an inner surface 205 of the rail, as shown in FIGS. 14 and 15. The rail supporting shoe preferably does not have raised ribs and preferably has greater clearances between the shoe and the rail to permit easy sliding of the rail, as shown in FIG. 16.

In another embodiment, a rail locking system 47 may be provided for locking the rails 35 in place relative to the cutting tool 140. The rail locking system 47 may include a shoe biasing system 210 for biasing the rail locking shoe 160 to engage the rail against rail locking side member 130. As shown in FIGS. 10 and 11, the rail 35 may be pinched against an engaging surface 161 by biasing the shoe inwardly toward the engaging surface. The rails 35 may be coupled together by a coupling system 155 that couples a front rail locking system 162 to a rear rail locking system 163. The coupling system 155 may be configured for simultaneously biasing front and rear rail locking shoes 160 for simultaneous locking of the front and rear rails 145, 150.

As shown in FIGS. 10 and 11, in one embodiment, a shoe biasing system 210 may include a coupling member 190 such as a bolt that extends through the rail locking shoe 160. The coupling member 190 and rail locking shoe 160 may be biased inwardly toward the base 25 for example by rotating a rotating member 225 that is threadably coupled to the coupling member or bolt 190. As shown in FIGS. 10 and 11, the rotating member 225 may have internal threads 226 and the coupling member or bolt 190 may have external threads 227. Threadably advancing the coupling member 190 into the rotating member 225 will bias the rail locking shoe 160 to lock the rail. A handle 230 may be provided to facilitate turning of the rotating member 225.

In one embodiment, a coupling system 155 may include a rotating member 225 that is threadably coupled to both front coupling member 235 and rear coupling member 240. As shown in FIGS. 10 and 11, front coupling member 235 may have external left-handed threads and rear coupling member 240 has external right-handed threads. Rotating member 225 has corresponding internal right-handed and left-handed threads. Because both the front and rear coupling members are held in a rotationally stationary position by a rail-locking shoe, rotating the rotating member 225 will threadably advance both coupling members 235, 240 toward the rotating member 225 to simultaneously lock both the front and rear rails 145, 150.

Figure 8:
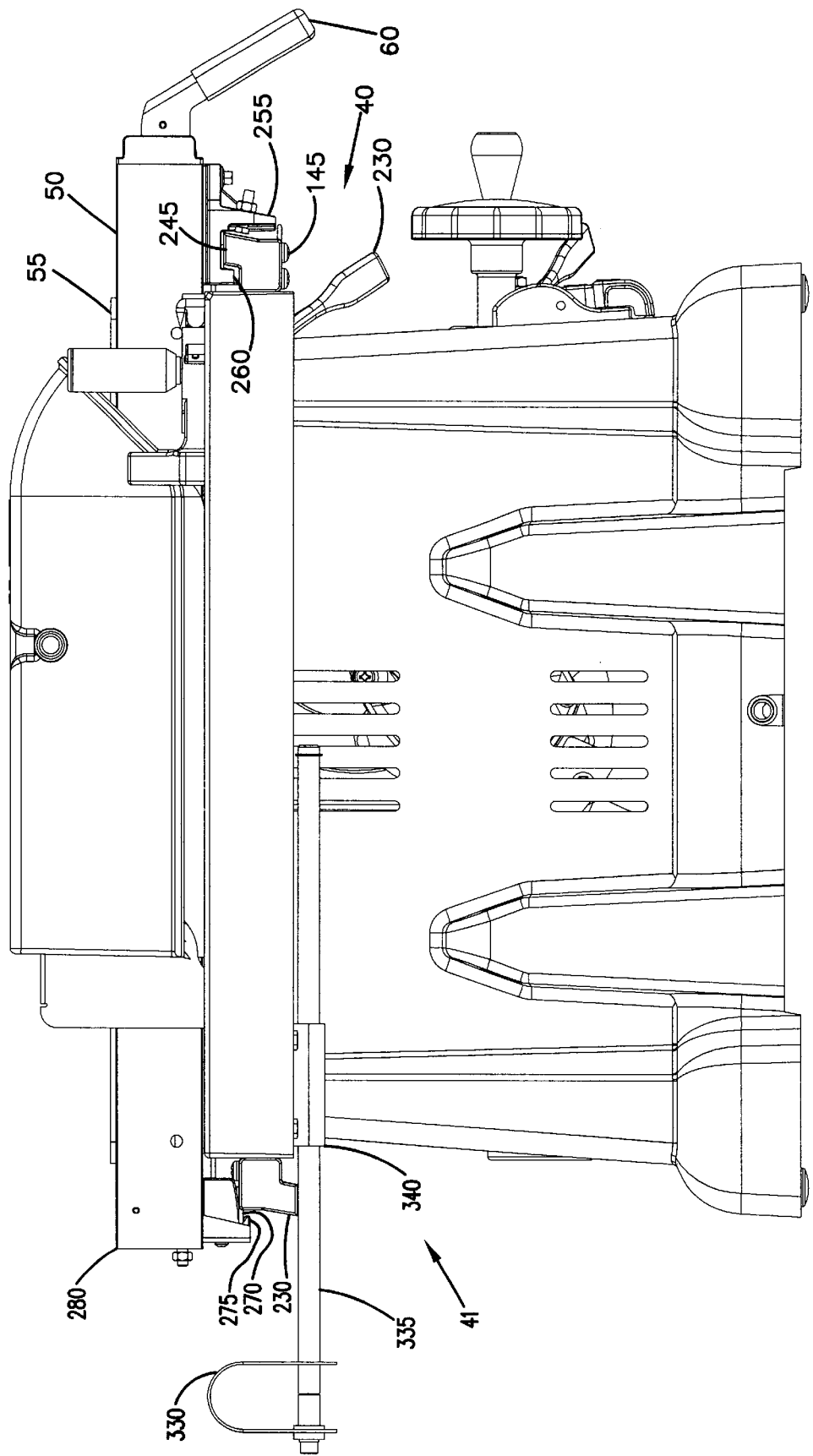
FIG. 8 is a left side elevational view thereof.
Figure 9:
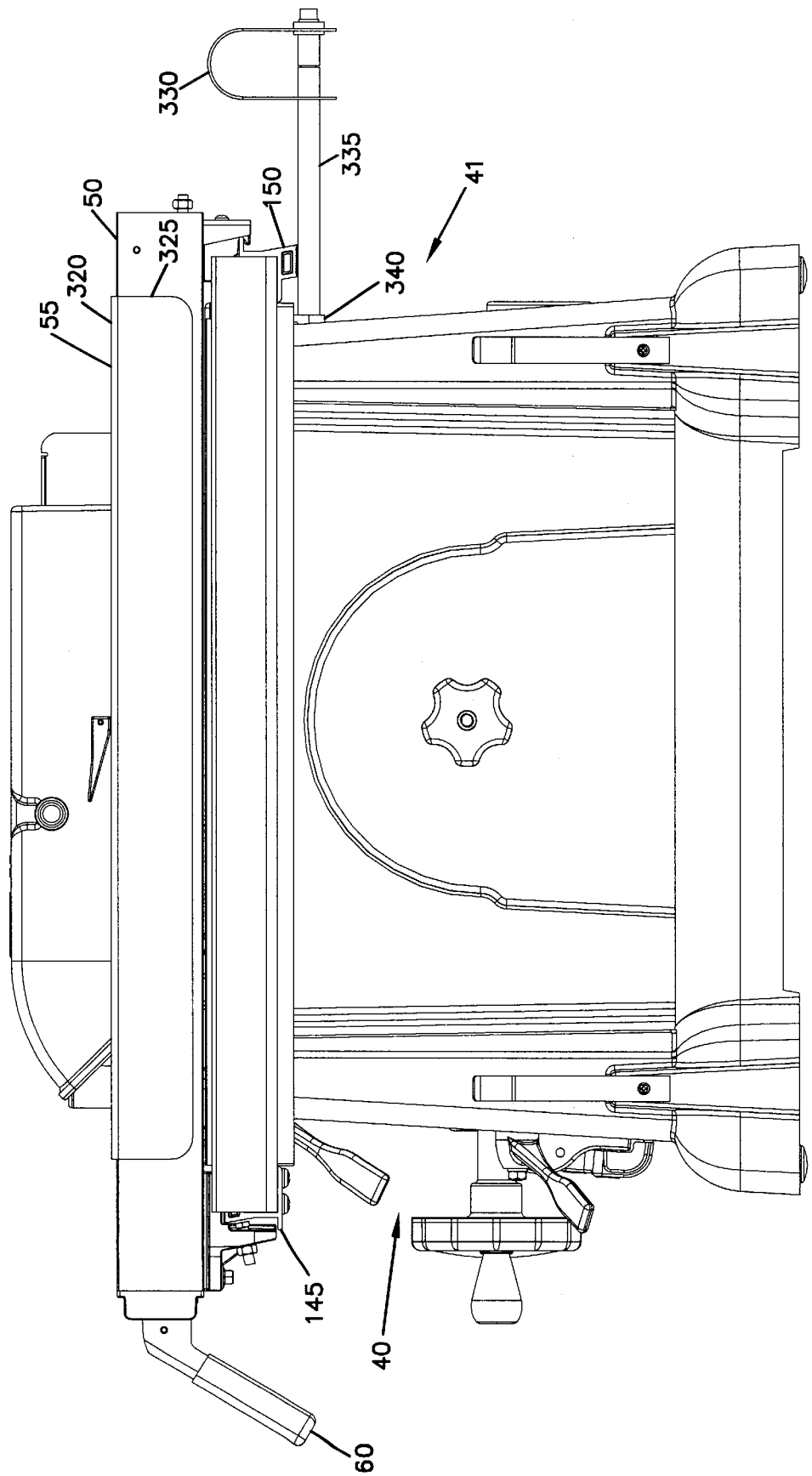
FIG. 9 is a right elevational view thereof.
Figure 12:
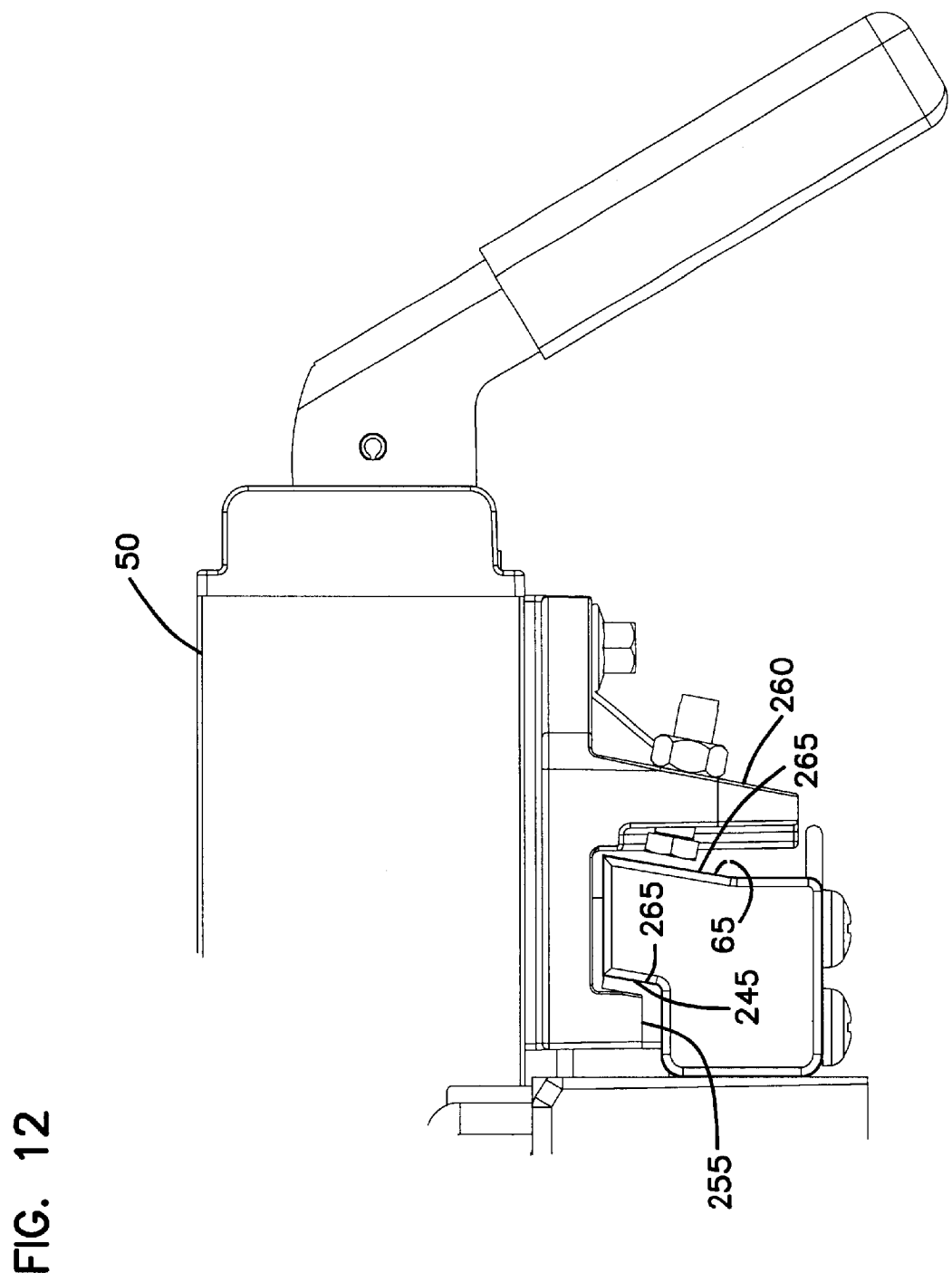
FIG. 12 is an enlarged view of the left side elevational view showing the front rail and a sled slidably disposed on the front rail.
Figure 13:
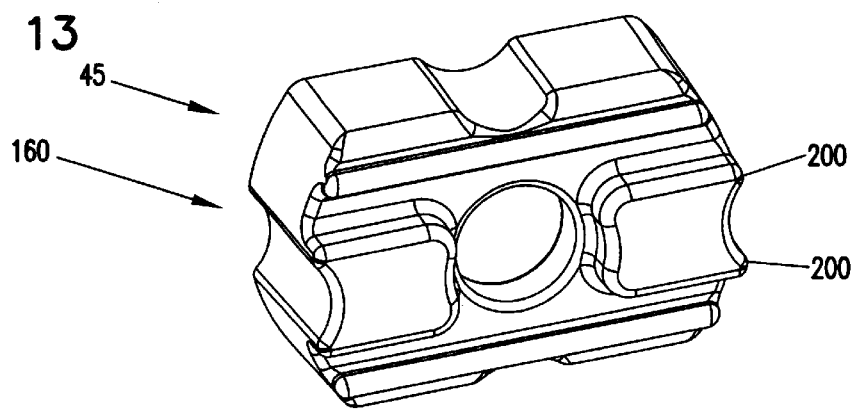
FIG. 13 is a front top left perspective view of a T-Nut or shoe for coupling a rail to a surface.

In one embodiment, the rip fence 35 may be coupled to a sled 57 which is slidably disposed on the front rail 145. As shown in FIGS. 8, 10, and 12, the front rail may include an upwardly-extending sled-engaging member 245. The sled-engaging member 245 may include a downwardly-angled face 65 for slidably coupling with the sled 57. The sled 57 includes front and rear rail-engaging members 255, 260 which extend downwardly on front and rear sides of the sled-engaging member 250. Sliding pads 265 are coupled to the front and rear rail-engaging members 255, 260 for slidably engaging the front rail 65. The engagement of the downwardly-angled face 65 produces a downwardly-angled force for aligning the fence 50 with the work table 30 and cutting tool.

The rear rail 150 may be provided with a lip 270 for engaging the rip fence assembly. As shown in FIGS. 8 and 11, a lip 270 extends outwardly from the rear rail 150 in the outfeed direction. A lip-engaging member 275 hooks around the lip 270 to couple the rear end 280 of the fence 50 to the rail 150.

As may be observed from FIGS. 1 and 8, in one embodiment, a single part may be used to provide both the front rail 145 and the rear rail 155. The rear rail 150 may include the same structure as the front rail 145 and may be rotated 180 degrees around an axis extending along the length of the rail so that the top surface 280 of the front rail 145 corresponds to the bottom surface 285 of the rear rail 150.

As shown in FIGS. 2 and 3, in one embodiment, the rail system may be configured to receive a supplemental support member 75 for providing a supplemental work surface 80 beyond the upper surface of the work table. The supplemental support member 75 is preferably a planar member. The supplemental support member 75 may be supported by the rails 35, by a cross-member 80 that couples the rails together, or by a ledge 85 extending outward from the work table 30. More particularly, as shown in FIGS. 3 and 5, a supplemental support member 75 may be supported at front and rear support member edges 90, 100 by support surfaces 95, 105 on the rails, at a left support member edge 110 by a support surface 115 on the lip 85 extending from the work table 30, and at a right support member edge 120 by a support surface 125 on the cross-member 80. The various support surfaces 95, 105, 115, 125, which are preferably coplanar, can be seen in FIGS. 4 and 5.

The various support surfaces 95, 105, 115, 125 may be configured to receive a supplemental support member 75 at a predetermined depth to provide a supplemental work surface 80 that has an upper surface 290 that is substantially coplanar with the upper surface 31 of the work table 30. The predetermined depth may advantageously be ¾". To prevent the supplemental support member 75 from sliding out of position, a support member restraining lip 295 may be provided for example at the right rear portion of the work table.

As shown in FIGS. 4 and 5, in another embodiment, a removable L-shaped rip fence ledge 55 may be coupled to the rip fence 50 for supporting a workpiece that extends beyond the work table upper surface 31. The rip fence ledge 55 includes a mounting member 320 for removably mounting the ledge to the fence 50 and a supporting member 325 for supporting a work piece. The rip fence ledge may be coupled to a latch assembly 305 and one or more guiding pegs 311 which may be inserted through corresponding holes 312, 313 in the top wall 310 or right wall 315 of the fence.

The rip fence ledge 55 may be oriented in two positions on the rip fence 50. The rip fence ledge may be oriented in an "in use" position beneath the rip fence, as shown in FIGS. 4 and 5, or in a "storage" position on top of the rip fence, as shown in FIGS. 1 and 3. In the "in use" position, the ledge 55 is coupled to the right side of the fence 50 with the supporting member 325 of the ledge extending beneath the fence toward the saw blade. In this position the rip fence ledge provides a vertical support surface 56 for supporting a work piece. The vertical support surface 56 is preferably coplanar with the upper surface 31 of the work table.

When the rip fence ledge 55 is not in use, it may be removed and set aside or stored on top of the rip fence. As shown in FIGS. 1 and 2, in the "storage" position, the ledge 55 may be oriented on top of the fence 50 such that the supporting member 325 of the ledge extends downwardly from the top of the fence along the right side of the fence, which faces away from the saw blade. In this storage position, the ledge does not interfere with the adjustability of the rip fence 50 at locations across the surface of the work table, nor does it add thickness to the blade side 300 of the rip fence.

In one embodiment, the rip fence ledge 55 may be secured to the rip fence 50 with latch assembly 305. The latch assembly 305 may be configured to engage a hole 312, 313 in the top wall 310 or right wall 315 of the rip fence 50 to secure the rip fence in either the "storage" position or the "in use" position. The latch assembly 305 includes a handle 306 that is pivotably coupled to a rod 307. The rod 307 is coupled to a nut 308 which captures a rubber ring 309 between the nut 308 and the ledge 55. The handle 306 can be rotated from an "open" position, in which the handle is generally aligned with the rod 307, to a "closed" position, in which the handle is nearly perpendicular to the rod. When the handle is rotated from the open position to the closed position, the handle pushes against the ledge to pull the rod 307 and nut 308 toward the ledge 55. This movement of the nut 308 compresses the rubber ring 309, which expands to engage the inner surface of the hole 312, 313 in the fence.

To move the rip fence ledge from the "in use" position to the "storage" position, the latch assembly 305 is disengaged, and the rip fence ledge 55 is removed from the rip fence 50. After the rip fence ledge 55 has been repositioned on top of the rip fence 50, the latch assembly 305 may be engaged with the top wall 310 of the rip fence 50 to secure the rip fence ledge in the storage position.

Similarly, to move the rip fence ledge 55 from the "storage" position to the "in use" position, the latch assembly may be disengaged and the rip fence ledge may be repositioned on the right wall 315 of the fence, which faces away from the saw blade in FIG. 2. The ledge is configured so that in the "in use" position the supporting member 325 extends under the fence toward the saw blade. With the ledge in this position, the latch assembly may be engaged with the right wall 315 to secure the rip fence ledge 55 in place.

As shown in FIGS. 2–5, 8, and 9, in another embodiment, an outfeed support member 330 may be provided on the rear or outfeed side of the work table 30 to provide support for a work piece after it is cut. The outfeed support member 330 may be supported by two rods 335, each of which may be slidably coupled to the underside of the work table 30 with a cylindrical bushing 340.

Figure 19:
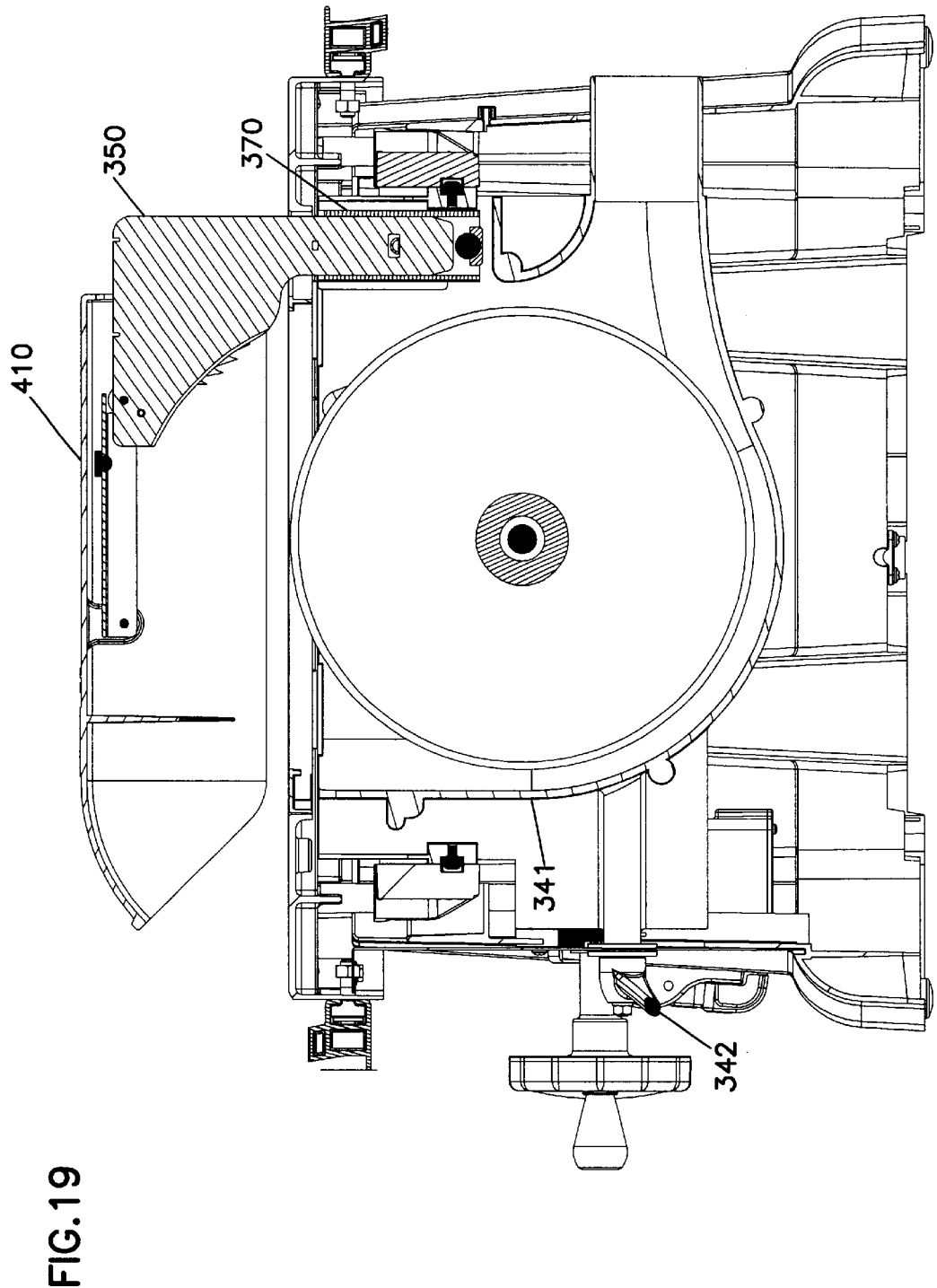
FIG. 19 is a right cross-sectional view thereof.
Figure 20:
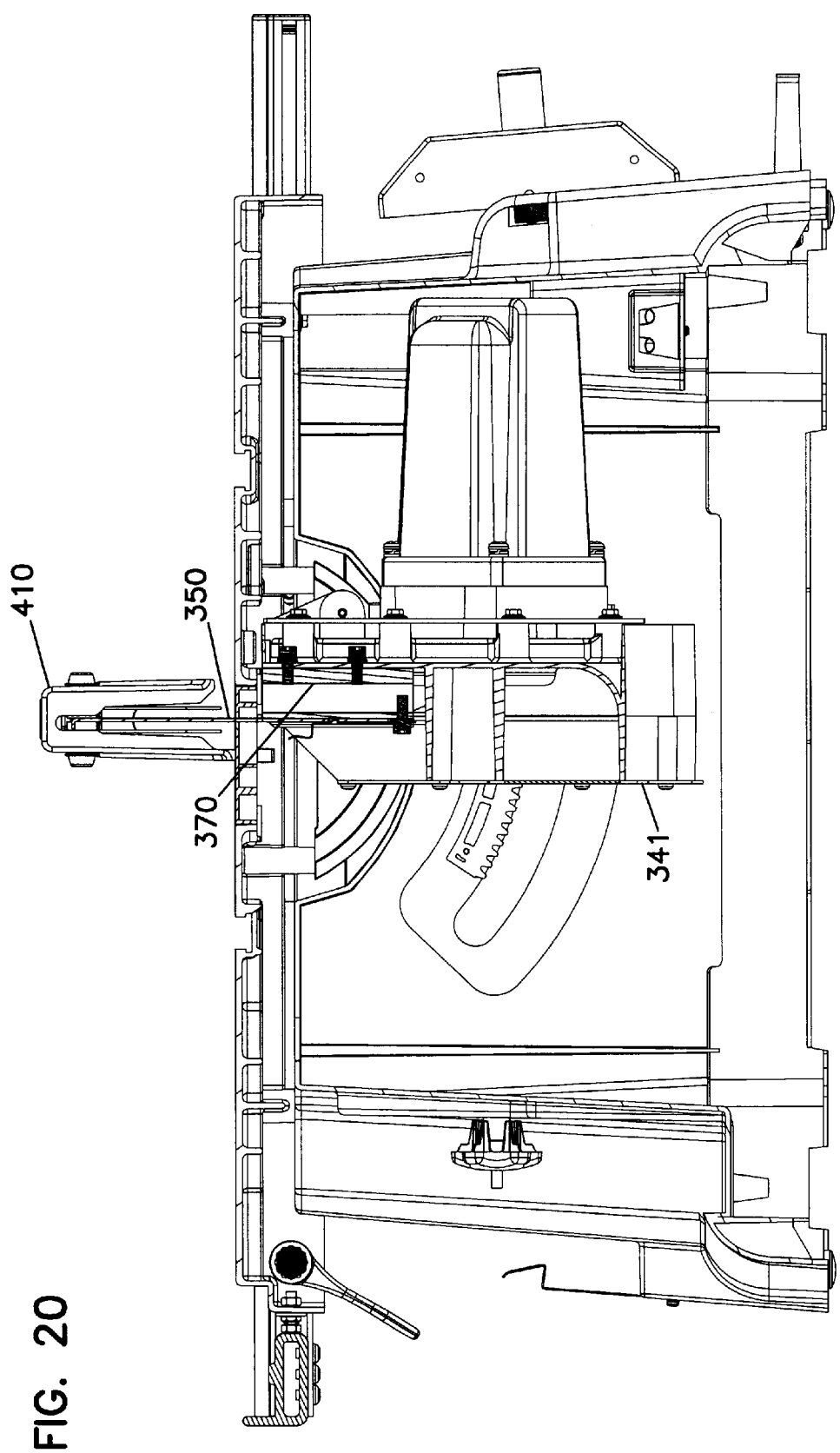
FIG. 20 is a rear cross-sectional view thereof.

As shown in FIGS. 19 and 20, an arbor 341 may be provided. FIG. 19 shows that the motor may be mounted to the arbor. The arbor 341 may be configured so that it may rotate in relation to the base 25, thereby permitting adjustment of the blade 140 angle. For example, turning a handle 342 on the front of the saw may permit the arbor 341 to be rotated to a new position. The arbor 341 may be secured in the new position by turning the handle back the other way.

As shown for example in FIGS. 1, 8, and 20, blade guard assembly 410 comprising a removeable spreader plate 350 (or "kerf splitter plate") may be provided for guiding and spreading cut pieces of a workpiece. In one embodiment, a clip or catch 355 may be provided for coupling the spreader plate 350 to the machine. The catch 355 may be biased by a spring 360 and may be configured so that the spreader plate 350 may be released by biasing the catch. In one embodiment, the catch may be biased without the use of a wrench. For example, in one embodiment, the catch 360 can be biased with a person's finger.

Figure 22:
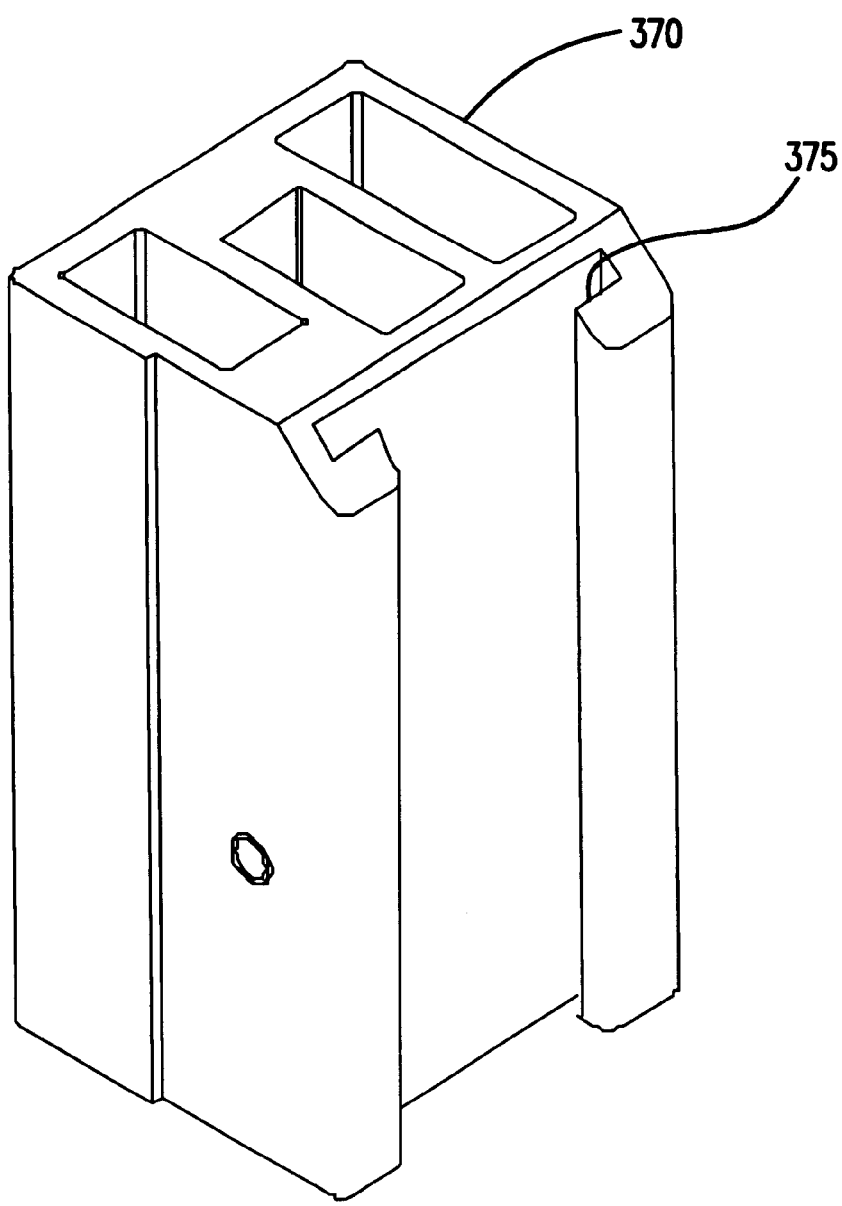
FIG. 22 is a perspective view of the anchor block.
Figure 23:
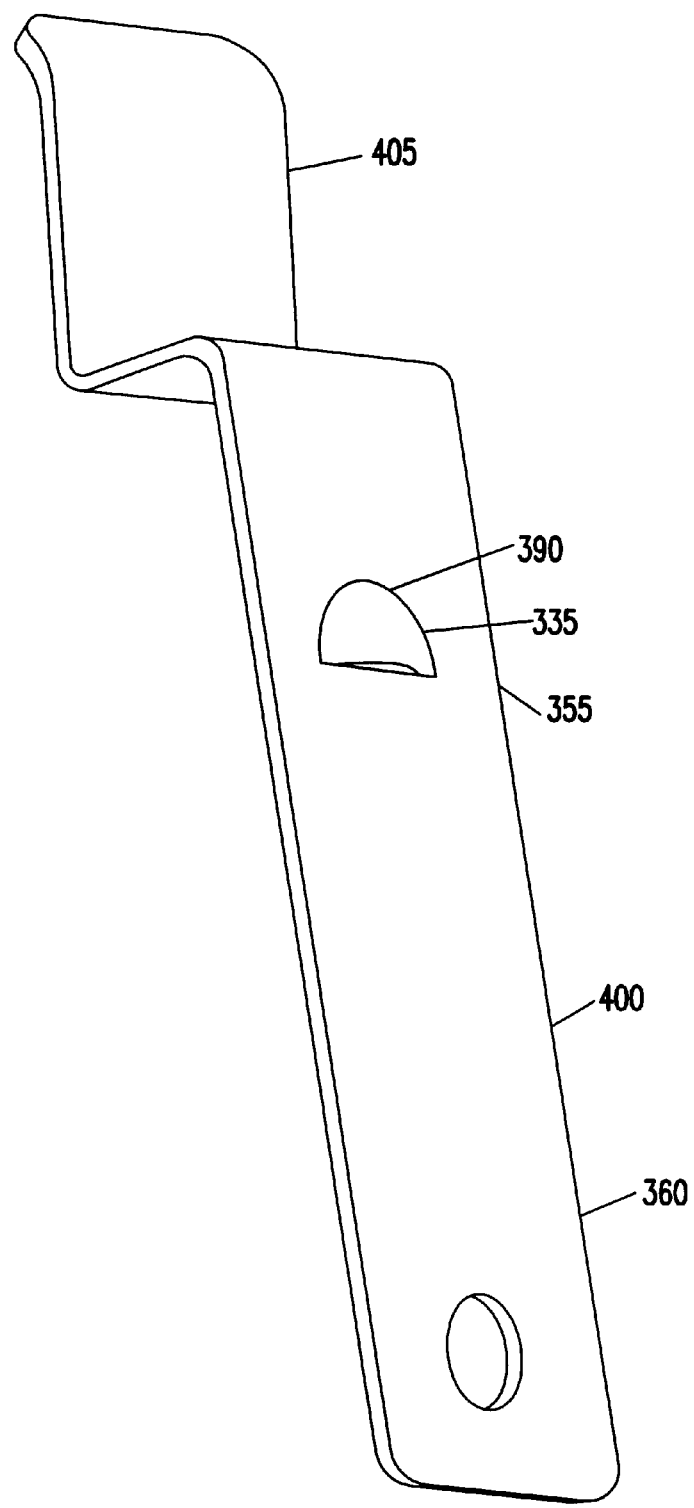
FIG. 23 is a perspective view of a catch for coupling and decoupling a spreader plate with an anchor block.

As shown in FIGS. 19 and 23, the spreader plate 350 may include a downwarldy extending member 365 that extends below the works surface and couples with the table saw to function as a mounting plate. An anchor block 370, shown in FIGS. 19, 22, and 23, may be provided for receiving the downwardly extending member 365 of the spreader plate 350. The anchor block 370 may be coupled to the arbor for example with a bolt or screw 372 to provide for simultaneous angular adjustment of the blade 140 and the spreader plate.

Figure 21:
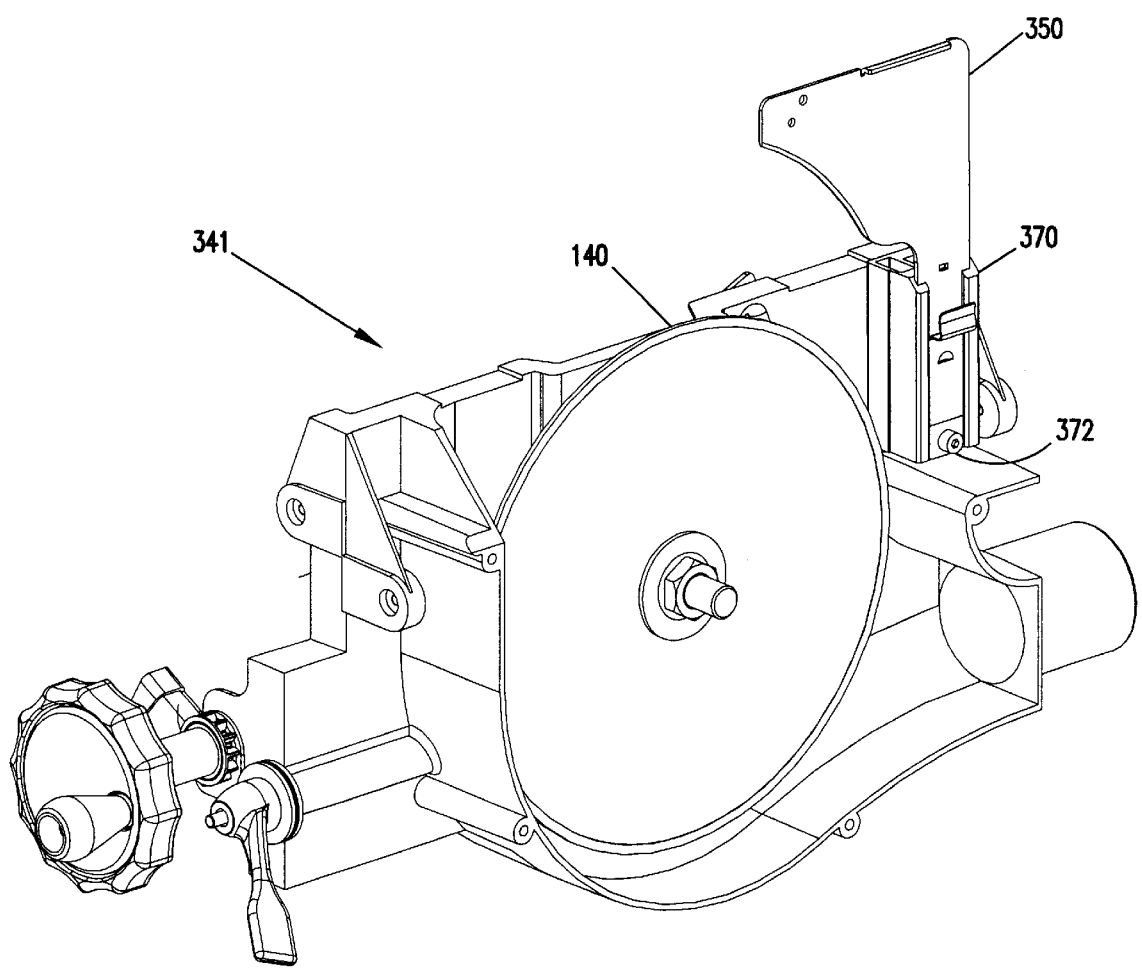
FIG. 21 is a perspective view showing the spreader plate inserted into an anchor block which is coupled to arbor assembly.

The anchor block 370 may include portions which define a channel 375 into which the spreader plate 350 may extend. The channel 375 in the anchor block 370 may be configured to substantially restrict lateral and rotational movement of the spreader plate, but permit axial (i.e. vertical) movement of the plate. To secure the spreader plate 350 axially or vertically with respect to the anchor block 370, a clip or catch 355 may be provided, as shown in FIGS. 20, 21 and 23. As shown in FIG. 19, the spreader plate 350 may include portions which define a slot 380. An outwardly extending portion 385 of the catch 355, such as a dimple 390 as shown in FIGS. 20 and 23, may be configured to engage the slot 380 in the separator plate 350, thereby impeding vertical movement of the plate.

To couple the catch 355 with the spreader plate 350, the catch may be biased with a spring 395. In one embodiment the catch itself may include portions which form a spring. In one embodiment, the catch may be formed from spring steel. As shown in FIG. 23, the catch may include a main section 400 and an offset section 405. The offset section 405 may be configured to permit access by a tool or by a person's finger. In one embodiment, biasing the catch 355 away from the anchor block 370 withdraws the dimple 390 from the slot 380 in the spreader plate, thereby releasing the spreader plate 350 and permitting removal of the spreader plate by lifting it upwardly out of the machine.

As shown in FIGS. 1, 8, and 19, the blade guard assembly may include a blade guard 411 which is coupled to the spreader plate 350. In one embodiment, the blade guard 411 may be pivotably coupled to an arm 415 which is pivotably coupled to the spreader plate 350. A pair of serrated plates 420, one on each side of the spreader plate, may also be provided for further guiding a workpiece. The serrated plates may be coupled and biased with a spring 425.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A machine tool comprising:

a base;

an arbor for mounting a cutter, the arbor when adjusted to a cutting position having at least one of a selected cuffing height and cutting angle, the arbor being coupled to the base;

a cutter guard assembly configured for coupling to and decoupling from the arbor; and a spring-loaded catch for coupling and decoupling the cutter guard assembly to the arbor, the spring-loaded catch being biasable by a human finger.

2. The machine tool of claim 1 wherein the arbor is configured to be adjustably tiltable in relation to the base.

3. The machine tool of claim 1 wherein the cutter guard assembly comprise a mounting plate, and wherein the spring-loaded catch comprises a spring and a catch for engaging the mounting plate, the catch being biased by the spring.

4. The machine tool of claim 3 wherein the spring comprises a generally planar metallic spring plate.

5. The machine tool of claim 4 wherein, in an unbiased position, the spring plate is generally planar.

6. The machine tool of claim 5 wherein the catch extends outwardly from the spring plate.

7. The machine tool of claim 6 wherein the catch comprises a side portion is configured to bias the spring as the mounting plate is pressed toward the catch.

8. The machine tool of claim 7 wherein the catch side portion comprises a curved portion.

9. The machine tool of claim 8 wherein the catch is formed by impressing a die into the spring plate.

10. An apparatus for coupling a mounting plate component of a cutter guard assembly to a machine tool, the apparatus comprising:

a base;

a work table having an upper surface, the work table being coupled to the base;

a cutter mounting system configured for mounting and adjustably locating a cutter substantially in a variable-angle cutting plane angularly-adjustable over a range of angular positions, including perpendicular to the work table upper surface, in both a cutting position in which the cutter protrudes above the work table upper surface and in a receded position in which the cutter is receded below the work table upper surface;

an anchor block that is coupled to the cutter mounting system, the anchor block having portions that define a slot for receiving a cutter guard mounting plate;

a spring plate that is coupled to the anchor block, the spring plate being configured so that portions of the spring plate are biased toward the mounting; and a catch that is coupled to the spring plate, the catch being biased by the spring plate and being configured for engaging and disengaging the mounting plate.

11. The apparatus of claim 10 wherein the cutter guard mounting plate comprises portions defining a hole and wherein the catch is configured to engage the hole.

12. The apparatus of claim 10 wherein the spring plate is configured to be activated by a human finger.

13. A machine tool comprising an arbor, a removable cutter guard assembly, and a leaf spring that is arranged and configured to couple and decouple the removable cutter guard assembly to the arbor, the leaf spring being biasable by a human finger to permit removal of the cutter guard assembly from the arbor.

14. A table saw, comprising:

a base;

a work table having an upper surface, the work table being coupled to the base;

a cutter mounting system configured for mounting and adjustably locating a cutter substantially in a variable-angle cutting plane angularly-adjustable over a range of angular positions, including perpendicular to the work table upper surface, in both a cutting position in which the cutter protrudes above the work table upper surface and in a receded position in which the cutter is receded below the work table upper surface;

an anchor block that is coupled to the cutter mounting system, the anchor block having portions that define a slot for receiving a cutter guard mounting plate;

a spring plate that is coupled to the anchor block, the spring plate being configured so that portions of the spring plate are biased toward the mounting plate; and a catch that is coupled to the spring plate, the catch being biased by the spring plate and being configured for engaging and disengaging the mounting plate.

15. The table saw of claim 14, wherein the cutter guard mounting plate comprises portions defining a hole and wherein the catch is configured to engage the hole.

16. The apparatus of claim 10, wherein the spring plate is configured to be activated by a human finger.

* * * * *